United States Patent Office 2,842,579
Patented July 8, 1958

2,842,579

PREPARATION OF MONO- AND DIARYLARSINES

Louis Schmerling, Riverside, Ill., assignor to Universal Oil Products Company, Des Plaines, Ill., a corporation of Delaware No Drawing. Application June 22, 1955
Serial No. 517,369

7 Claims. (Cl. 260—440)

This invention relates to a process for preparing mono- and diarylarsines, and more particularly to a process for obtaining higher yields of the aforementioned compounds.

It is known that the reaction of an aromatic compound such as benzene with arsenic trichloride in the presence of a Friedel-Crafts type catalyst such as aluminum chloride will yield triphenylarsine, together with smaller amounts of phenylarsine dichloride and diphenylarsine chloride. However, it has also been found that between 30 and 40% of the total arsenic present in the reaction mixture is recovered as the free element, due to the fact that aromatic arsenic derivatives are decomposed by the aluminum chloride present in the reaction.

It is an object of this invention to obtain mono- and diarylarsines instead of triarylarsines from the reaction between an aromatic compound and arsenic trichloride by carrying out the reaction in the presence of a saturated hydrocarbon.

One embodiment of the invention resides in a process for the preparation of an arsine containing at least one aryl substituent but not more than two aryl substituents by reacting an aromatic compound with arsenic trichloride in the presence of a Friedel-Crafts type catalyst and a saturated hydrocarbon, and recovering the resultant arylarsine.

A specific embodiment of the invention is found in a process for the preparation of an arsine selected from the group consisting of monoarylarsines and diarylarsines by reacting an aromatic compound with arsenic trichloride in the presence of aluminum chloride and a saturated hydrocarbon containing a tertiary carbon atom, and recovering the resultant arylarsine.

A more specific embodiment of the invention resides in a process for the preparation of an arylarsine by reacting benzene with arsenic trichloride in the presence of aluminum chloride and isobutane, and recovering the resultant phenylarsine and diphenylarsine.

Other objects and embodiments referring to alternative aromatic compounds and alternative saturated hydrocarbons containing a tertiary carbon atom will be found in the following detailed description of this invention.

It is now proposed to prepare mono- and diarylarsines by reacting arsine trichloride with an aromatic compound in the presence of a saturated hydrocarbon containing a tertiary carbon atom or a saturated hydrocarbon capable of being isomerized to such a compound under the conditions of the reaction. The resultant mono-arylarsine dichloride and diarylarsine chloride will be reduced to monoarylarsine and diarylarsine respectively. For example, when benzene is reacted with arsenic trichloride in the presence of aluminum chloride and isobutane, the formation of diphenylarsine will proceed according to the following equations.

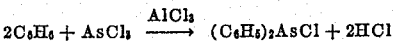
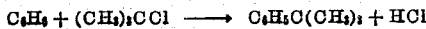

The preparation of a phenyl arsine can be illustrated by the following equations:

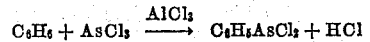
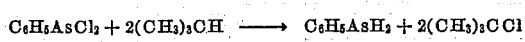
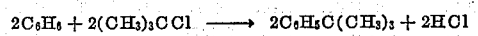

Higher boiling arsenic compounds, for example arsenobenzene ($C_6H_5As=AsC_6H_5$), formed by secondary reactions involving the phenylarsines and intermediate phenylarsine chlorides may also be obtained in these reactions.

The monoarylarsines and diarylarsines which result from this reaction and many of which are well-known compounds, may be used as intermediates in the preparation of pharmaceutical compounds, insecticides, and certain toxic products. For example, diphenylarsine may be used as a military vesicant.

Aromatic compounds which may be utilized in the present process include aromatic hydrocarbons such as benzene, toluene, m-xylene, p-xylene, o-xylene, ethylbenzene, propylbenzene, butylbenzene, etc. Substituted aromatic compounds including halogenated benzenes such as chlorobenzene, bromobenzene, fluorobenzene, iodobenzene, dichlorobenzenes, trichlorobenzenes, tetrachlorobenzenes, etc., along with aromatic compounds containing hydroxy and amino substituents such as phenols and aniline, etc., may also be used but not necessarily with equivalent results. It is to be understood that the above mentioned compounds are only representative of the classes of compounds which may be used in this invention, and said invention is not necessarily limited thereto.

The saturated hydrocarbons which may be used include paraffins and cycloparaffins containing tertiary carbon atoms as well as hydrocarbons which may be isomerized to such tertiary carbon atom containing hydrocarbons under the reaction conditions. These hydrocarbons include isobutane, isopentane, 2-methylpentane, 2-methylhexane, 2,3-dimethylbutane, etc.; methylcyclopentane, ethylcyclopentane, propylcyclopentane, methylcyclohexane, ethylcyclohexane, propylcyclohexane, 1,2-dimethylcyclopentane, 1,2-diethylcyclopentane, 1,2-methylcyclohexane, 1,2-ethylcyclohexane, decahydronaphthalene, etc. n-Alkanes such as n-butane and n-pentane and cyclohexane may also be used under conditions favorable to their isomerization; however, isoalkanes are preferred because their greater activity permits the reaction to be carried out at lower temperatures.

The reaction conditions under which the process of this invention proceeds will depend largely upon the reactants and the materials utilized therein. The reaction is usually catalyzed by the use of a Friedel-Crafts type compound, the preferred catalysts comprising aluminum chloride, aluminum bromide, zirconium chloride, boron fluoride, etc., although other metallic halides of this class such as ferric chloride and zinc chloride may be used, however, but not necessarily with equivalent results. Generally speaking, temperatures ranging from about $-20°$ to about $+150°$ C. or more will be used in the reaction. When aluminum chloride is used to catalyze the reaction, the temperature is in the range of from about $-20°$ to about $+100°$ C., the preferred range being from about 20° to about 80° C.

The reaction may be effected in any suitable manner and may comprise either a batch or a continuous type operation. When a batch type operation is used, a quantity of the aromatic compound, the saturated hydrocarbon and the catalyst are placed in an appropriate reaction apparatus such as a vessel equipped with a mixing device and kept at the predetermined temperature. A solution of the arsenic trichloride in excess aromatic hydrocarbon is then added gradually to the well-stirred mixture. At the end of the reaction time, the vessel and contents thereof are allowed to come to room temperature and the reaction product, namely, the monoarylarsines and diarylarsines, are separated from the catalyst layer, washed, dried, and subjected to fractional distillation to separate out the desired products.

Since the arylarsines are readily oxidized by contact with air, it is essential that the reaction and subsequent operations be carried out under oxygen-free nitrogen, carbon dioxide or other inert atmospheric conditions.

Another type of operation comprises the continuous type. In this operation the starting materials comprising the aromatic compound, the saturated hydrocarbon and the arsenic trichloride and the catalyst are continually charged to a reaction zone which is maintained at the proper operating conditions of temperature and pressure. The reaction zone may comprise an unpacked vessel or coil, or may contain an adsorbent packing material such as dehydrated bauxite, fire brick, alumina or the like. The aforementioned starting materials may, if so desired, be introduced into the reaction zone in separate streams or the aromatic hydrocarbon and the arsenic trichloride may be admixed prior to entry into the vessel and added thereto in a single stream. A particularly suitable type of continuous operation comprises a fixed bed type in which the Friedel-Crafts type catalyst is disposed as a bed in the reaction zone, while the reactants are passed therethrough in a continuous stream in either an upward or downward flow. The reaction will continue until a desired time has elapsed, after which time the reaction products will be continually withdrawn from the reaction zone, the liquid products separated from the products and subjected to fractional distillation under reduced pressure to separate the monoarylarsines, the diarylarsines, and the unreacted starting materials, the latter being recycled for use as a portion of the feed stock while the reaction products are purified by conventional means.

Other continuous types of processes which may be used in this invention include the fluidized type of operation, the compact moving bed type of operation, and the slurry type process.

The following examples are given to illustrate the process of this invention which, however, are not intended to limit the generally broad scope of the invention in strict accordance therewith.

*Example I*

90 g. of arsenic trichloride dissolved in 200 g. of benzene is added during a period of approximately 2 hours to a stirred mixture of 200 g. of benzene and 100 g. of isopentane and 5 g. of aluminum chloride maintained at a temperature of approximately 35° C. in an oxygen-free nitrogen atmosphere. The reaction mixture is stirred for an additional hour at the aforementioned temperature after which the upper layer is separated from the lower catalyst layer, washed with water and dilute alkali, dried and subjected to fractional distillation under reduced pressure. A cut boiling at 90–95° C. (70 mm.) and a cut boiling at 170–175° C. (25 mm.) comprising phenylarsine and diphenylarsine, respectively, are separated from the reaction product. An intermediate cut boiling at about 110° C. at 70 mm. and consisting of pentylbenzenes is also obtained.

*Example II*

A solution of 90 g. of arsenic trichloride dissolved in 200 g. of α- and β-methyl-naphthalenes is added during a period of approximately 2 hours to a stirred mixture of 200 g. of the methylnaphthalenes, 200 g. of methylcyclohexane, and 5 g. of aluminum chloride, said mixture being maintained at a temperature of 40–70° C. The reaction is stirred for an additional hour at this temperature after which the upper layer is separated from the lower catalyst layer, washed with water and dilute alkali, dried and subjected to fractional distillation under reduced pressure. The reaction products comprising methylnaphthylarsine and bis(methylnaphthyl)arsine and (methylcyclohexyl)methylnaphthalene are separated from unreacted starting materials.

I claim as my invention:

1. In the process of reacting an aromatic hydrocarbon with arsenic trichloride in contact with a Friedel-Crafts type catalyst, the improvement which comprises effecting the reaction in the presence of a saturated hydrocarbon containing a tertiary carbon atom and having not more than about 10 carbon atoms per molecule.

2. The improvement of claim 1 further characterized in that said saturated hydrocarbon is an isoparaffin.

3. The improvement of claim 1 further characterized in that said saturated hydrocarbon is a cycloparaffin.

4. The improvement of claim 1 further characterized in that said saturated hydrocarbon is isobutane.

5. The improvement of claim 1 further characterized in that said saturated hydrocarbon is isopentane.

6. The improvement of claim 1 further characterized in that said saturated hydrocarbon is methylcyclopentane.

7. A process as defined in claim 1 further characterized in that said catalyst comprises aluminum chloride.

References Cited in the file of this patent

Anhydrous Aluminum Chloride in Organic Chemistry, C. A. Thomas, Rheinhold Pub. Co., New York (1941), pp. 171–173.